United States Patent
Hongo

(10) Patent No.: US 7,792,161 B2
(45) Date of Patent: Sep. 7, 2010

(54) OPTICAL FIBER FOR FIBER LASER, FIBER LASER, AND LASER OSCILLATION METHOD

(75) Inventor: Akihito Hongo, Tsuchiura (JP)

(73) Assignee: Hitachi Cable, Ltd., Tokyo (JP)

( * ) Notice: Subject to any disclaimer, the term of this patent is extended or adjusted under 35 U.S.C. 154(b) by 95 days.

(21) Appl. No.: 11/260,688

(22) Filed: Oct. 28, 2005

(65) Prior Publication Data
US 2006/0098694 A1    May 11, 2006

(30) Foreign Application Priority Data
Oct. 28, 2004    (JP) ............................. 2004-314223

(51) Int. Cl.
*H01S 3/30* (2006.01)
(52) U.S. Cl. .......................... 372/6; 385/125
(58) Field of Classification Search ...................... 372/6
See application file for complete search history.

(56) References Cited

U.S. PATENT DOCUMENTS

| | | | |
|---|---|---|---|
| 6,539,155 B1 * | 3/2003 | Broeng et al. ................ | 385/125 |
| 6,826,335 B1 * | 11/2004 | Grudinin et al. ............... | 385/43 |
| 6,831,934 B2 * | 12/2004 | Wang et al. ..................... | 372/6 |
| 6,987,783 B2 * | 1/2006 | Fajardo et al. .................. | 372/6 |
| 7,082,148 B2 * | 7/2006 | Payne et al. ..................... | 372/60 |
| 7,283,711 B2 | 10/2007 | Bayart et al. | |
| 7,403,689 B2 | 7/2008 | Koch, III et al. | |
| 2001/0026667 A1 | 10/2001 | Kawanishi et al. | |
| 2002/0131742 A1 | 9/2002 | Bayart et al. | |
| 2003/0165313 A1 | 9/2003 | Broeng et al. | |
| 2003/0231846 A1 | 12/2003 | Fajardo et al. | |
| 2005/0105867 A1 * | 5/2005 | Koch et al. .................. | 385/125 |

FOREIGN PATENT DOCUMENTS

| | | |
|---|---|---|
| CN | 1375712 A | 10/2002 |
| JP | 2001-318260 A | 11/2001 |
| JP | 2002-055239 A | 2/2002 |
| JP | 2002-055240 A | 2/2002 |
| JP | 2002-185063 A | 6/2002 |
| JP | 2002-277669 A | 9/2002 |
| JP | 2002-359420 A | 12/2002 |
| JP | 2002-541507 A | 12/2002 |
| JP | 2003-227941 A | 8/2003 |
| JP | 2007-511919 A | 5/2007 |
| WO | WO 00/60388 A1 | 10/2000 |
| WO | WO 03/019257 A | 3/2003 |

OTHER PUBLICATIONS

P. Yuzhai et al., "High-Power Ytterbium-Doped Fiber Laser Based on Fiber Grating," ACTA Optica Sinica, vol. 24, No. 9, Sep. 2004, pp. 1237-1239, English translation pp. 1-5.

* cited by examiner

*Primary Examiner*—Minsun Harvey
*Assistant Examiner*—Kinam Park
(74) *Attorney, Agent, or Firm*—Foley & Lardner LLP

(57) ABSTRACT

An optical fiber for a fiber laser has: a hollow core region; an inner cladding region having a plurality of holes that extend in a longitudinal direction of the optical fiber and surround the hollow core region; and an outer cladding region that surrounds the inner cladding region. The inner cladding region has a solid part that is made of a glass material into a part or all of which a rare earth element is doped, and the outer cladding region has a refractive index lower than that of the solid part of the inner cladding region.

15 Claims, 3 Drawing Sheets

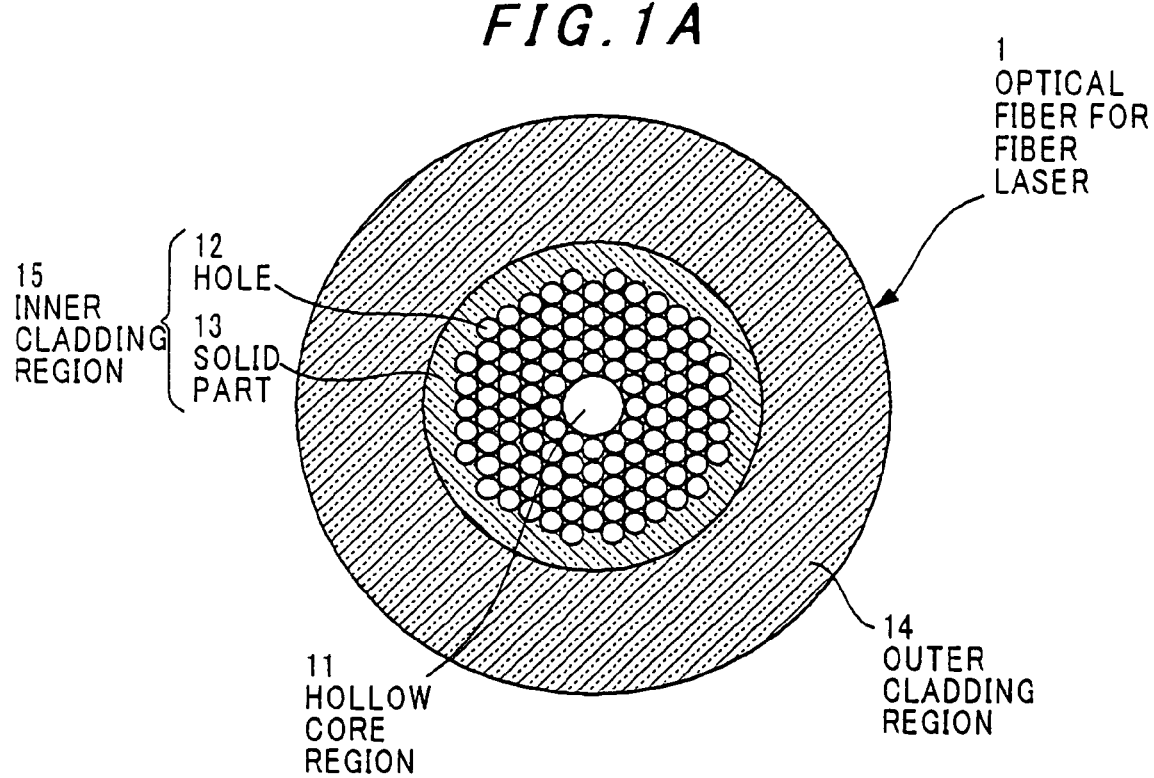
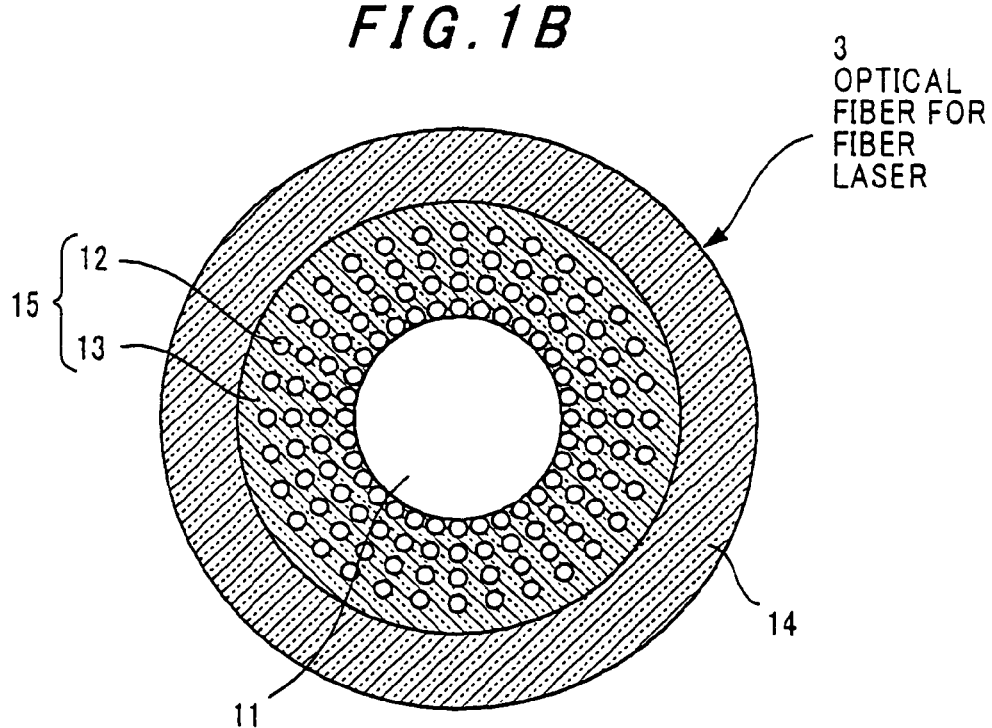

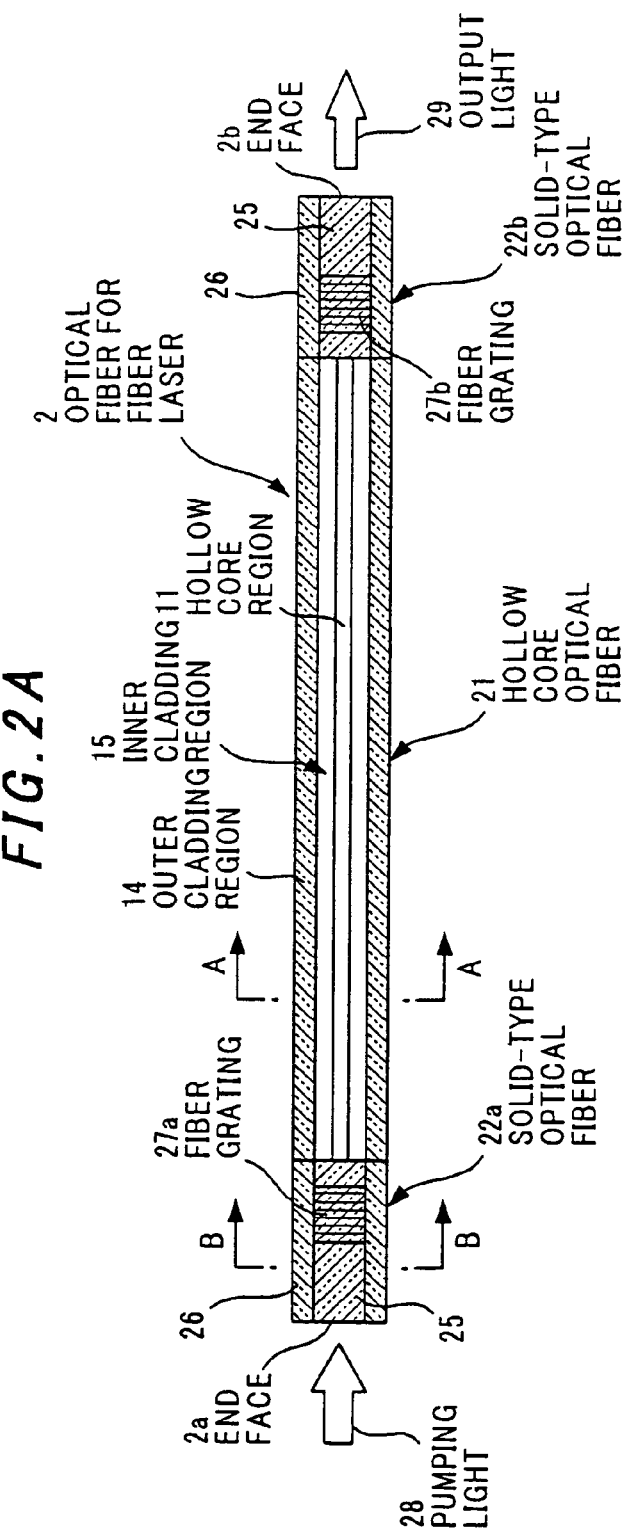
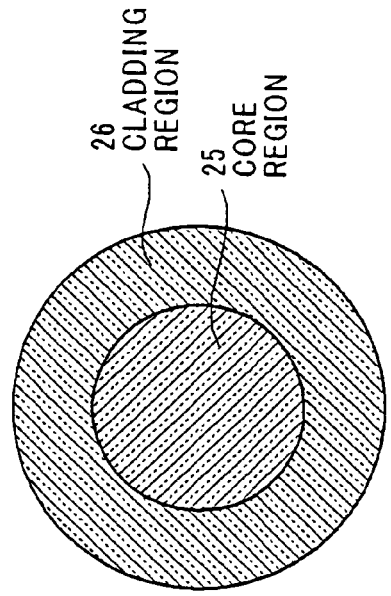
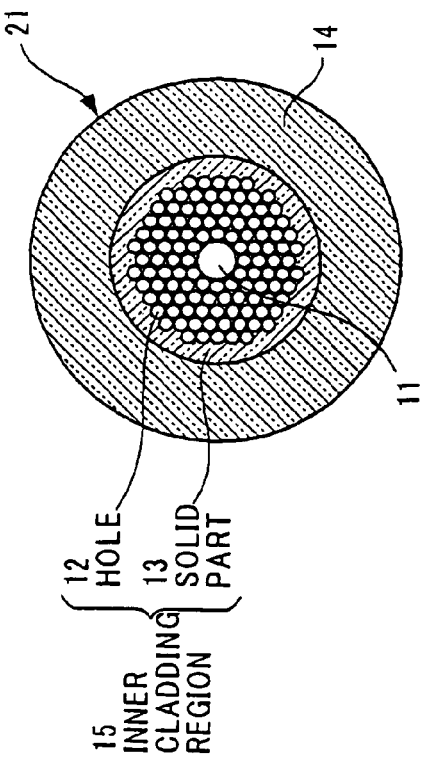

OPTICAL FIBER FOR FIBER LASER, FIBER LASER, AND LASER OSCILLATION METHOD

The present application is based on Japanese patent application No. 2004-314223, the entire contents of which are incorporated herein by reference.

BACKGROUND OF THE INVENTION

1. Field of the Invention

This invention relates to an optical fiber for a fiber laser that oscillates a high-output laser beam and is useful for laser processing, medical use and the like. Also, this invention relates to a fiber laser and a laser oscillation method using the optical fiber.

2. Description of the Background Art

FIG. 3 shows an optical fiber 41 with a double cladding structure used for a conventional fiber laser.

A core region 42 is doped with a rare earth element such as neodymium (Nd), ytterbium (Yb), erbium (Er) and thorium (Th). The core region 42 is surrounded by an inner cladding region 44, and the inner cladding region 44 is surrounded by an outer cladding region 45.

In operation, pumping light 46 is incident into the optical fiber 41, propagates in multiple modes through the inside of the inner cladding region 44, and gradually attenuated being absorbed into the core region 42. When the pumping light 46 is absorbed, the rare earth element is excited to oscillate a laser beam 48 (See, for example, JP-A-2002-055239).

Fiber lasers using the optical fiber 41 with a double cladding structure as described above have increased in output power year by year, and now realizes oscillation of several hundreds watts.

However, when one attempts to realize oscillation of a further higher output power, the power density within the core region 42 will be extremely high, thereby possibly destroying the core region 42. This is because, due to the non-linear optical effect, the refractive index of the core region 42 rises according as the laser energy increases, thereby causing the self-focusing effect of the laser energy.

Thus, current fiber lasers are limited to oscillation of several hundreds watts. In order to have oscillation of a higher output power, the core region must be enlarged. However, when the core region is enlarged, a multi-mode oscillation will appear instead of a single-mode oscillation, making it impossible to obtain a laser beam with high quality.

In order to obtain the single-mode oscillation even when the core is enlarged to some extent, the optical fiber for fiber laser can be rolled to restrain excitation at higher modes by using the fact that the bend loss of the higher mode is larger than the bend loss of the lower mode while reducing energy density (power density) of the laser by enlarging the core region. However, there is a limit to the extension of the core size that can maintain the single-mode oscillation. Further, the optical fiber for the fiber laser needs to be rolled and, for use in laser processing or for medical use, a transmission path for guiding the laser beam from a light source to an irradiated object is needed other than the fiber laser as the light source. The optical fiber for the fiber laser cannot be used both as the light source and the transmission path for delivery of the laser beam. This not only makes the optical system complicated, but also causes end face destruction at the connecting portion or deterioration in quality of oscillated laser beam.

SUMMARY OF THE INVENTION

It is an object of the invention to provide an optical fiber for fiber laser that can serve both as a light source and as a transmission path to guide a laser beam as well as offering a high-output fiber laser.

(1) According to one aspect of the invention, an optical fiber for a fiber laser comprises:

a hollow core region;

an inner cladding region comprising a plurality of holes that extend in a longitudinal direction of the optical fiber and surround the hollow core region; and an outer cladding region that surrounds the inner cladding region, wherein the inner cladding region comprises a solid part that is made of a glass material into a part or all of which a rare earth element is doped, and the outer cladding region has a refractive index lower than that of the solid part of the inner cladding region.

In the above invention, the following modifications and changes may be made.

(i) The outer cladding region is made of a glass material or a polymer resin that comprises fluorine.

(ii) The inner cladding region comprises the plurality of holes that have a bore diameter and an interval such that a band gap is formed with respect to an oscillation wavelength band of a laser beam of the fiber laser.

(iii) The optical fiber further comprises a reflector to reflect a laser light in an oscillation wavelength band of the fiber laser, and the reflector is disposed at one end or both ends of the optical fiber.

(iv) The optical fiber further comprises a solid-type optical fiber comprising a core region made of a silica material with germanium doped thereto, and the solid-type optical fiber is connected to one end or both ends of the optical fiber for the fiber laser.

(v) The solid-type optical fiber comprises the core region that a fiber grating to reflect a laser light in an oscillation wavelength band of the fiber laser is formed.

(vi) The solid-type optical fiber comprises the core region with a diameter that is substantially equal to an outer diameter of the inner cladding region of the optical fiber for the fiber laser.

(2) According to another aspect of the invention, a laser oscillation method comprises:

providing an optical fiber for a fiber laser as defined above;

launching pumping light into the optical fiber for the fiber laser;

propagating the pumping light through the hollow core region and/or the inner cladding region of the optical fiber for the fiber laser such that the pumping light is confined therein; and oscillating and propagating a laser light, which is emitted from the rare earth element of the solid part of the inner cladding region, while confining the oscillated laser light in the hollow core region.

(3) According to another aspect of the invention, a laser oscillation method comprises:

providing an optical fiber for a fiber laser as defined above, wherein the optical fiber further comprises reflectors to reflect a laser light in an oscillation wavelength band of the fiber laser, and the reflectors are disposed at both ends of the optical fiber and compose a resonator;

launching pumping light into the optical fiber for the fiber laser;

propagating the pumping light through the hollow core region and/or the inner cladding region of the optical fiber for the fiber laser such that the pumping light is confined therein; and oscillating and propagating a laser light, which is emitted from the rare earth element of the solid part of the inner cladding region, while confining the oscillated laser light in the hollow core region.

In the above invention, the following modifications and changes may be made.

(vii) The reflector comprises a solid-type optical fiber comprising a core region made of a silica material with germanium doped thereto, and the core region comprises a fiber grating to reflect a laser light in an oscillation wavelength band of the fiber laser.

(4) According to another aspect of the invention, a fiber laser comprises:

an optical fiber for a fiber laser as defined in claim 1; and a pumping light source.

The effects of the invention are as follows.

(1) Since most of oscillated laser energy propagates through the hollow core region, the damage threshold is very high, so that a high-output fiber laser of kW class can be realized.

(2) Since it is possible to selectively oscillate only the lowest mode without suppressing the higher mode by rolling, a laser light with high quality can be obtained, and also the optical fiber with the hollow core region can serve both as a light source and a transmission path.

BRIEF DESCRIPTION OF THE DRAWINGS

The preferred embodiments according to the invention will be explained below referring to the drawings, wherein:

FIG. 1A is a cross-sectional view showing an optical fiber for a fiber laser in a preferred embodiment of the invention;

FIG. 1B is a cross-sectional view showing an optical fiber for a fiber laser in another preferred embodiment of the invention;

FIG. 2A is a side view showing an optical fiber for fiber laser in a second preferred embodiment of the invention;

FIG. 2B is a cross-sectional view cut along a line A-A in FIG. 2A;

FIG. 2C is a cross-sectional view cut along a line B-B in FIG. 2A; and

DETAILED DESCRIPTION OF THE PREFERRED EMBODIMENTS

Figure 3:
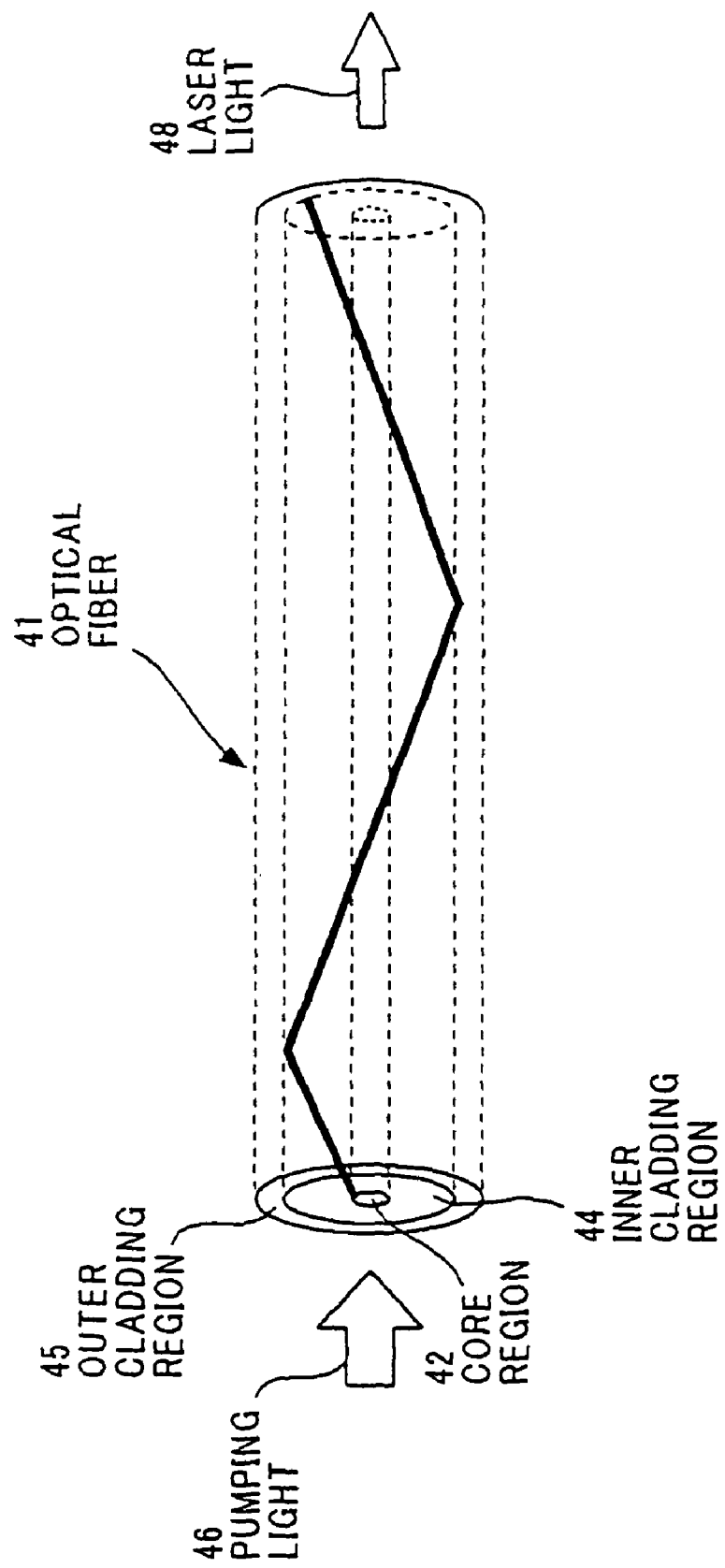
FIG. 3 is a side view showing the conventional optical fiber with a double cladding structure.

FIG. 1A is a transversal cross-sectional view showing an optical fiber for a fiber laser in the first embodiment of the invention.

The optical fiber for the fiber laser of the embodiment is made of a hollow-core optical fiber having a hollow core region.

Referring to FIG. 1A, an optical fiber 1 for a fiber laser comprises a hollow core region 11, an inner cladding region 15 surrounding the hollow core region 11, and an outer cladding region 14 surrounding the inner cladding region 15. Further, the inner cladding region 15 comprises a plurality of holes 12 extending in a longitudinal direction of the optical fiber 1 for the fiber laser (fiber 1) and surrounding the hollow core region 11.

In FIG. 1A, the holes 12 are disposed around the hollow core region 11 so as to attain generally the closest packing. It is sufficient that the diameter of the hollow core region 11 is larger than the wavelength of the laser beam, and is suitably set in accordance with a power of the laser beam and a diameter of the optical beam. The bore diameter of these holes 12 and the interval between the holes 12 are set such that a band gap is formed for the wavelength (oscillation wavelength band) of the laser beam to be oscillated. This allows the light in an oscillation wavelength band of the laser beam to propagate through the hollow region with low loss. Here, referring to FIG. 1B, the holes 12 may be disposed by being arranged on a plurality of concentric circles with the center of the core serving as a center. The shape and the arrangement of the holes 12 are not limited to these, so that any shape and any arrangement can be implemented as long as they are set to form a band gap for a wavelength of the laser beam.

The pumping light is not particularly limited. For example, a high-output multi-mode semiconductor laser beam having a wavelength of 0.8 μm to 0.98 μm is used. The wavelength (oscillation wavelength band) of the laser beam is not particularly limited. The bore diameter of the holes 12 and the interval between the holes 12 are set such that, for example, a laser beam in a 1.06 μm, 1.0 μm or 0.9 μm band may be oscillated.

In the optical fiber 1 for the fiber laser, the solid part 13 surrounding the hollow core region 11 and the plurality of holes 12 located on the outside thereof is made of a glass material containing a rare earth element partially or over a whole region thereof. The glass such as silica and phosphate can be used as the material containing the rare earth element. As the rare earth element, Nd or Yb can be used, for example. Depending on the wavelength of the laser to be oscillated, a rare earth element such as Er or Th can also used.

The outer cladding region 14 located outside of the inner cladding region 15 in the radial direction is solid, and is made of a silica or phosphate glass material containing fluorine. The outer cladding region 14 has a lower refractive index than the solid part 13 of the inner cladding region 15. Here, the outer cladding region 14 may be made of a polymer resin containing fluorine.

Next, a function of the optical fiber 1 for the fiber laser according to this embodiment will be described.

When a pumping light is launched into the optical fiber 1 for the fiber laser, the pumping light propagates through the hollow core region 11 and/or the inner cladding region 15. The pumping light is gradually attenuated by being absorbed into the solid part 13 of the inner cladding region 15. In the process, when the rare earth element contained in the inner cladding region 15 absorbs the pumping light, a laser beam oscillates.

The oscillated laser beam is enclosed in the hollow core region 11 and propagates through the hollow core region 11. As described above, in this embodiment, a hollow-core optical fiber having a hollow core region 11 and a plurality of holes 12 surrounding the hollow core region 11 is used as an optical fiber 1 for a fiber laser, and a band gap in the inner cladding region 15 is formed so as to attain low transmission loss for the oscillation wavelength of the laser beam. Here, since the transmission loss of the higher mode is larger than the transmission loss of the lower mode, only the lowest mode is selectively oscillated, so that a high beam quality close to the single-mode oscillation is maintained.

On the other hand, the pumping light propagates by being enclosed in the hollow core region 11 and/or the inner cladding region 15. Since the outer cladding region 14 is made of a glass material containing fluorine and is formed to have a relatively lower refractive index than the solid part 13 of the inner cladding region 15, the pumping light propagates without leakage to the outer cladding region 14. Here, the refractive index refers to the refractive index in the wavelength of the pumping light. With regard to the refractive index in the wavelength of the pumping light, the refractive index of the outer cladding region 14 is set to be relatively lower than the refractive index of the solid part 13 of the inner cladding region 15.

In this manner, with the optical fiber 1 for the fiber laser according to this embodiment, almost all of the oscillated laser energy propagates through the hollow core region 11, so that the damage threshold is very high, and the optical fiber 1 is hardly damaged even if the laser energy density is made extremely high. For this reason, a high-output fiber laser of kW class can be realized.

In addition, since it is possible to oscillate only the lowest mode selectively even without restraining the higher mode by rounding, a laser beam with high quality can be obtained, and also the optical fiber 1 can serve both as a light source and a transmission path for delivery of the laser beam.

FIG. 2 shows the second embodiment of the invention for obtaining laser oscillation.

Referring to FIG. 2, in an optical fiber 2 for fiber laser according to the second embodiment, solid-type optical fibers 22a, 22b are respectively disposed at both ends of a hollow-core optical fiber 21 having a structure similar to that of the optical fiber 1 for fiber laser according to the first embodiment.

In the hollow-core optical fiber 21, a hollow core region 11 and a plurality of holes 12 surrounding the hollow core region 11 are formed in a manner similar to that of the first embodiment. A band gap is formed in this hollow-core optical fiber 21 by adjustment of the bore diameter of the holes 12 and the interval between the holes 12 in accordance with the wavelength of the laser oscillation.

Short solid-type silica optical fibers 22a, 22b are respectively connected by fusion splice to both ends of the hollow-core optical fiber 21. This short solid-type silica optical fiber 22 includes a core region 25 made of a germanium-doped silica material and a cladding region 26 having a lower refractive index than the core region 25.

Within the core region 25, a fiber grating 27a or 27b is formed in which the refractive index of the core region 25 is periodically changed by excimer laser radiation. The fiber grating 27a or 27b constitutes a reflector (filter) for reflecting light in the oscillation wavelength band of the laser. The reflection center wavelength of the fiber gratings 27a, 27b at the two ends is equal to the oscillation wavelength of the laser. The reflectivity of the fiber grating 27a at one end (left end in FIG. 2) is set to be about 99% or higher, and the reflectivity of the fiber grating 27b at the other end (right end in FIG. 2) is set to be about 96%.

In the optical fiber 2 for the fiber laser, these fiber gratings 27a, 27b that reflect the light in the laser oscillation wavelength constitute a resonator, and output light 29 obtained by laser oscillation is taken out from the end surface 2b of the optical fiber 2 for the fiber laser on the side where the fiber grating 27b having the lower reflectivity is formed.

The pumping light 28 is allowed to be incident into the optical fiber 2 through the end surface 2a on the side where the fiber grating 27a having the higher reflectivity in the laser oscillation wavelength is formed. Since the pumping light 28 does not undergo reflection by the fiber grating 27a, the pumping light is efficiently incident through the end surface 2a of the optical fiber 2 for fiber laser and propagates through the hollow-core optical fiber 21 while being gradually attenuated.

The diameter of the core region 25 of the solid-type optical fiber 21 having the fiber grating 27 formed therein is set to be substantially equal to the outer diameter of the inner cladding region 15. This allows that the pumping light 28 is efficiently incident into the hollow-core optical fiber 21 via the short solid-type optical fiber 22, thereby enhancing the conversion efficiency from the pumping light 28 to the oscillated light.

This embodiment can produce an effect similar to that of the first embodiment. Moreover, by connecting the hollow-core optical fiber 21 to the short solid-type optical fiber 22 provided with the fiber grating 27, a resonator structure can be easily formed. As a result of this, the system of laser processing or a laser treatment apparatus for medical use can be simplified.

In this embodiment, short solid-type optical fibers 22a, 22b are respectively connected to both ends of a hollow-core optical fiber 21; fiber gratings 27a, 27b are formed respectively in the solid-type optical fibers 22a, 22b at the two ends; and a resonator is formed between these two fiber gratings 27a, 27b to carry out laser oscillation. However, a resonator can be formed between one fiber grating and a Fresnel reflection surface without forming the other fiber grating.

Further, the reflector that constitutes the resonator and reflects light in the oscillation wavelength band of the laser may be made of a multiple-layer film reflection filter instead of the fiber grating.

Also, the solid-type optical fiber may be connected only to one end of the hollow-core optical fiber.

In this embodiment, the pumping light 28 is allowed to be incident through the end surface 2a where the fiber grating 27a having the larger reflectivity with respect to the wavelength of the laser oscillation is formed; however, the pumping light 28 may be allowed to be incident through both of the end surfaces 2a, 2b.

Furthermore, instead of allowing the pumping light to be incident through one end surface 2a or through both end surfaces 2a, 2b, the pumping light may be allowed to be incident through the side surface of the hollow-core optical fiber.

Also, a fiber laser can be formed by connecting a pumping light source to the optical fiber 1 for the fiber laser of FIG. 1A, the optical fiber 3 for fiber laser of FIG. 1B, or the optical fiber 2 for fiber laser of FIG. 2A.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical fiber for a fiber laser, comprising:
   a hollow core region;
   an inner cladding region comprising a plurality of holes that extend in a longitudinal direction of the optical fiber and surround the hollow core region; and
   an outer cladding region that is solid, without holes, and surrounds the inner cladding region,
   wherein the inner cladding region comprises a solid part that is made of a glass material into a part or all of which a rare earth element is doped and a diameter of each of the plurality of holes and intervals between the plurality of holes are set such that a band gap is formed with respect to a multi-mode oscillation wavelength of a laser beam and a transmission loss of a higher mode is larger than a transmission loss of a lower mode with respect to the oscillation wavelength of the laser beam, a distance from a hole located at an outermost portion of the inner cladding region to the outer cladding region is greater than a distance between adjacent holes in the inner cladding region, and the outer cladding region has a refractive index lower than that of the solid part of the inner cladding region.

2. The optical fiber for a fiber laser according to claim 1, wherein:

the outer cladding region is made of a glass material or a polymer resin that comprises fluorine.

3. The optical fiber for a fiber laser according to claim 1, wherein:

the optical fiber further comprises a reflector to reflect a laser light in an oscillation wavelength band of the fiber laser, and the reflector is disposed at one end or both ends of the optical fiber.

4. The optical fiber for a fiber laser according to claim 1, wherein:

the optical fiber further comprises a solid-type optical fiber comprising a core region made of a silica material with germanium doped thereto, and the solid-type optical fiber is arranged at one end or both ends of the optical fiber for the fiber laser.

5. The optical fiber for a fiber laser according to claim 4, wherein:

the solid-type optical fiber comprises the core region in which a fiber grating is formed to reflect a laser light in an oscillation wavelength band of the fiber laser.

6. The optical fiber for a fiber laser according to claim 5, wherein:

the solid-type optical fiber comprises the core region with a diameter that is substantially equal to an outer diameter of the inner cladding region of the optical fiber for the fiber laser.

7. A laser oscillation method, comprising:

providing an optical fiber for a fiber laser as defined in claim 1;

launching pumping light into the optical fiber for the fiber laser;

propagating the pumping light through the hollow core region and/or the inner cladding region of the optical fiber for the fiber laser such that the pumping light is confined therein; and oscillating and propagating a laser light, which is emitted from the rare earth element of the solid part of the inner cladding region, while confining the oscillated laser light in the hollow core region.

8. A laser oscillation method, comprising:

providing an optical fiber for a fiber laser as defined in claim 1, wherein the optical fiber further comprises reflectors to reflect a laser light in an oscillation wavelength band of the fiber laser, and the reflectors are disposed at both ends of the optical fiber and compose a resonator;

launching pumping light into the optical fiber for the fiber laser;

propagating the pumping light through the hollow core region and/or the inner cladding region of the optical fiber for the fiber laser such that the pumping light is confined therein; and oscillating and propagating a laser light, which is emitted from the rare earth element of the solid part of the inner cladding region, while confining the oscillated laser light in the hollow core region.

9. The laser oscillation method according to claim 8, wherein:

a reflector comprises a solid-type optical fiber comprising a core region made of a silica material with germanium doped thereto, and the core region comprises a fiber grating to reflect a laser light in an oscillation wavelength band of the fiber laser.

10. A fiber laser, comprising:

an optical fiber for a fiber laser as defined in claim 1; and a pumping light source.

11. An optical fiber for a fiber laser, comprising:

a hollow core optical fiber, comprising:

a hollow core region;

an inner cladding region comprising a plurality of holes that extend in a longitudinal direction of the optical fiber and surround the hollow core region;

an outer cladding region that is solid, without holes, and surrounds the inner cladding region, wherein the inner cladding region comprises a solid part that is made of a glass material into a part or all of which a rare earth element is doped and a diameter of each of the plurality of holes and intervals between the plurality of holes are set such that a band gap is formed with respect to a multi-mode oscillation wavelength of a laser beam and a transmission loss of a higher mode is larger than a transmission loss of a lower mode with respect to the oscillation wavelength of the laser beam, a distance from a hole located at an outermost portion of the inner cladding region to the outer cladding region is greater than a distance between adjacent holes in the inner cladding region, and the outer cladding region has a refractive index lower than that of the solid part of the inner cladding region; and a solid-type optical fiber comprising a core region made of a silica material with germanium doped thereto, wherein the solid-type optical fiber is connected by a fusion-splice to one end or both ends of the hollow core optical fiber.

12. The optical fiber for a fiber laser according to claim 1, wherein:

the holes in the inner cladding region which are adjacent to each other in a circumferential direction are located equiangularly with respect to a center of the hollow core region.

13. The optical fiber for a fiber laser according to claim 11, wherein:

the holes in the inner cladding region which are adjacent to each other in a circumferential direction are located equiangularly with respect to a center of the hollow core region.

14. The optical fiber for a fiber laser according to claim 1, wherein:

a distance between the holes in the inner cladding region which are adjacent to each other in a circumferential direction is greater than a distance between holes in the inner cladding region which are adjacent to each other in a radial direction.

15. The optical fiber for a fiber laser according to claim 11, wherein:

a distance between the holes in the inner cladding region which are adjacent to each other in a circumferential direction is greater than a distance between holes in the inner cladding region which are adjacent to each other in a radial direction.

* * * * *